US012528668B2

(12) United States Patent
Kattainen et al.

(10) Patent No.: US 12,528,668 B2

(45) Date of Patent: Jan. 20, 2026

(54) METHOD FOR TESTING SAFETY CHARACTERISTICS OF AN ELEVATOR

(71) Applicant: Kone Corporation, Helsinki (FI)

(72) Inventors: Ari Kattainen, Helsinki (FI); Juha-Matti Aitamurto, Helsinki (FI); Antti Saarelainen, Helsinki (FI); Jussi Lahteenmaki, Helsinki (FI)

(73) Assignee: Kone Corporation, Helsinki (FI)

( * ) Notice: Subject to any disclaimer, the term of this patent is extended or adjusted under 35 U.S.C. 154(b) by 1323 days.

(21) Appl. No.: 17/225,535

(22) Filed: Apr. 8, 2021

(65) Prior Publication Data

US 2021/0331892 A1 Oct. 28, 2021

(30) Foreign Application Priority Data

Apr. 23, 2020 (EP) .................................... 20171049

(51) Int. Cl.

*B66B 5/00* (2006.01)
*B66B 1/28* (2006.01)
*B66B 1/34* (2006.01)
*B66B 5/02* (2006.01)

(52) U.S. Cl.

CPC .............. *B66B 5/0031* (2013.01); *B66B 1/28* (2013.01); *B66B 1/3461* (2013.01); *B66B 5/02* (2013.01)

(58) Field of Classification Search

CPC ............ B66B 5/00; B66B 1/3461; B66B 5/02
See application file for complete search history.

(56) References Cited

U.S. PATENT DOCUMENTS

| | | | | |
|---|---|---|---|---|
| 4,533,862 | A * | 8/1985 | Salihi | 187/296 |
| 4,567,560 | A * | 1/1986 | Polis | B66B 5/0018 714/E11.002 |
| 9,771,242 | B2 * | 9/2017 | Kattainen | B66B 5/0087 |
| 11,597,629 | B2 * | 3/2023 | Schmidt | B66B 1/3492 |
| 2007/0000735 | A1 * | 1/2007 | Hanninen | B66B 5/0093 187/292 |

(Continued)

FOREIGN PATENT DOCUMENTS

| | | |
|---|---|---|
| CN | 105293238 A | 2/2016 |
| CN | 107792740 A | 3/2018 |

(Continued)

OTHER PUBLICATIONS

European Search Report dated Feb. 11, 2021.

*Primary Examiner* — Shawki S Ismail
(74) *Attorney, Agent, or Firm* — Harness, Dickey & Pierce, P.L.C.

(57) ABSTRACT

A method for testing safety characteristics of an elevator includes driving the car in a test run while the car is empty to perform a balance check of the elevator according to a request to perform the balance check; and adjustably controlling operation of the elevator based on a result of the balance check. Such adjustably controlling includes, based on comparing the result of the balance check to predetermined criteria, selectively performing one of preventing normal operation of the elevator, operating the elevator according to a degraded elevator operation, or operating the elevator to perform a brake test of machinery brakes of the elevator based on a test load that is calculated based on the result of the balance check.

16 Claims, 3 Drawing Sheets

(56) References Cited

U.S. PATENT DOCUMENTS

Figure 1:
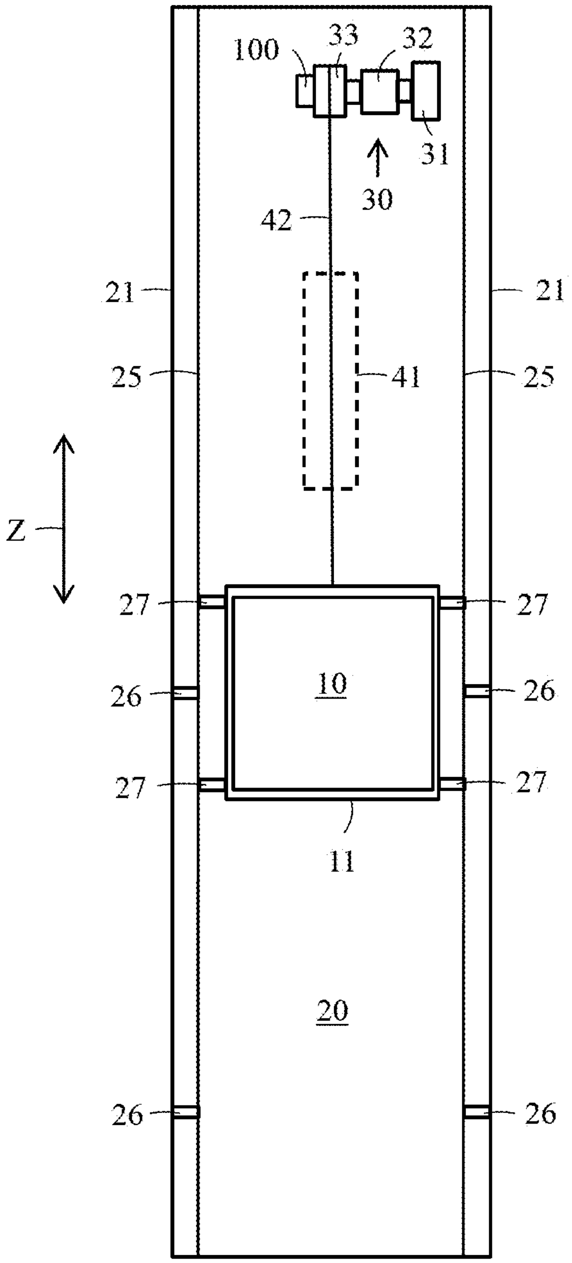

| | | | | |
|---|---|---|---|---|
| 2010/0154527 | A1* | 6/2010 | Illan | B66B 5/0093 73/121 |
| 2011/0288314 | A1* | 11/2011 | Kim | A61P 31/18 549/359 |
| 2015/0329320 | A1* | 11/2015 | Perälä | B66B 5/0025 187/276 |
| 2019/0330016 | A1* | 10/2019 | Tyni | G01G 19/14 |

FOREIGN PATENT DOCUMENTS

| | | | |
|---|---|---|---|
| CN | 110526079 | A | 12/2019 |
| EP | 1701904 | A2 | 9/2006 |
| EP | 1915311 | A2 | 4/2008 |
| EP | 2774885 | A1 | 9/2014 |

* cited by examiner

METHOD FOR TESTING SAFETY CHARACTERISTICS OF AN ELEVATOR

RELATED APPLICATIONS

This application claims priority to European Patent Application No. 20171049.8 filed on Apr. 23, 2020, the entire contents of which are incorporated herein by reference.

FIELD

The invention relates to a method for testing safety characteristics of an elevator.

BACKGROUND

An elevator may comprise a car, a shaft, hoisting machinery, ropes, and a counterweight. A separate or an integrated car frame may surround the car.

The hoisting machinery may be positioned in the shaft. The hoisting machinery may comprise a drive, an electric motor, a traction sheave, and a machinery brake. The hoisting machinery may move the car upwards and downwards in the shaft. The machinery brake may stop the rotation of the traction sheave and thereby the movement of the elevator car.

The car frame may be connected by the ropes via the traction sheave to the counterweight. The car frame may further be supported with gliding means at guide rails extending in the vertical direction in the shaft. The guide rails may be attached with fastening brackets to the side wall structures in the shaft. The gliding means keep the car in position in the horizontal plane when the car moves upwards and downwards in the shaft. The counterweight may be supported in a corresponding way on guide rails that are attached to the wall structure of the shaft.

The car may transport people and/or goods between the landings in the building. The shaft may be formed so that the wall structure is formed of solid walls or so that the wall structure is formed of an open steel structure.

The machinery brake may be formed of at least two electromechanical brakes. The brakes are used as safety devices to apply braking force to the traction sheave or the rotating axis of the hoisting machinery in order to stop the movement of the hoisting machinery and thereby also of the elevator car. The machinery brake should according to EN 81-20:2014 be dimensioned so that it is able to stop the elevator machinery when the car is travelling downwards at rated speed and with the rated load plus an overload of 25% i.e. with a load of 125%. If one brake fails, then the other brake should still be able to decelerate, stop and hold an elevator car standstill with the rated load i.e. with a load of 100%.

Due to their characteristics as safety devices, the operational condition of the machinery brakes must be verified.

EP 1 701 904 B1 discloses on method for testing the condition of the brakes of an elevator. According to the method, one brake is lifted, and the other brake, the engaged brake, is loaded with a test load for testing braking torque. If movement of the traction sheave is detected during the test, then the brake is considered defective.

EP 1 915 311 B1 discloses a method for ensuring operating safety in an elevator system. According to the method, only one of the brakes is engaged at the end of an elevator run and the other brake is engaged with a delay. The torque of the drive motor is removed when the first brake is engaged. If movement of the traction sheave is detected thereupon, then the brake is considered defective.

SUMMARY

Prior art methods for monitoring the brakes of an elevator may involve a problem.

The problem relates to a situation in which the balancing in the elevator is incorrect. An incorrect balancing may lead to a situation in which an erroneous (insufficient) test load is applied to the brakes in the brake test. The brake test will thus in fact become void when an insufficient load is applied to the brakes in the test.

The situation may be illustrated by an example. In an elevator having a rated load of 1000 kg and a balancing ratio of 50%, the weight of the counterweight should correspond to the weight of the empty elevator car plus 500 kg. If the balancing ratio of the elevator is erroneously 30%, instead of the intended 50%, then a resulting test load of 300 kg is provided to the hoisting machinery instead of the intended 500 kg when the brakes are tested. The brake will thus pass the brake test when the brake can hold the test load of 300 kg, which is only 60% of the intended test load 500 kg.

An erroneous balancing ratio may lead to a situation where the elevator car is operated with brakes that are not capable of stopping the movement of the elevator car properly. The problem may be caused by the result of the erroneous brake test. The masses to be decelerated may be greater than expected due to the balancing error. This is especially true for a full elevator car moving downwards.

The balancing of an elevator may change unexpectedly in connection with maintenance or modification works of the elevator. The decoration within the car might e.g. be changed. Further, in special elevator operations, such as in temporary construction-time operations, a (temporary) change of the balance may be done.

The invention is directed to an improved method for testing safety characteristics of an elevator.

The method for testing safety characteristics of an elevator according to the invention is defined in claim 1.

The invention will increase the safety of an elevator. The brakes will be tested with a test load corresponding to an actual test load, which has been calculated based on a balance check instead of a calculated test load based on an assumed balancing of the elevator.

The method for testing safety characteristics of an elevator comprises performing a balance check of the elevator according to a predetermined schedule. The unbalance calculated based on the results of the balance check is compared to the balance and rated load values of the lift which are specified in the basic characteristics of the elevator. The basic characteristics of the elevator may be stored in an electronic logbook.

The balance check should be done with an empty car. The load weighing information should give a close to zero load information before the test is performed. A situation in which close to zero load of the car is not detected during a certain predefined time period, might be caused by additional decoration that has been added to the car. This new load value may be defined as a new calibrated zero load.

Once the zero load is modified, it will typically lead to a change of the balance, if the counterweight remains unchanged. The setting of a new zero load, the actual balance after setting of the new zero load and relevant original basic characteristics of the elevator such as rated load and balance may be reported to the cloud. Information from the controller of the elevator may be transmitted by wire communication or by wireless communication to the cloud.

The scheduling of the balance check may be based on a time schedule. Additionally or alternatively, the scheduling of the balance check must be performed within a given time window from the received request. The request may be generated by a remote entity, such as a remote server or a cloud service.

If the balance check is not performed in accordance with the predetermined schedule, then normal elevator operation may be prevented.

The result of the balance check may be compared to predetermined criteria.

The predetermined criteria may be based on logbook values collected during earlier tests.

If the result of the balance check fulfils the predetermined criteria, then permission for conducting a brake test may be granted.

If the result of the balance check does not fulfil the predetermined criteria, then normal operation of the elevator may be prevented.

At least one balance error margin may be used when determining whether the balancing satisfies the predetermined criteria. The balance error margin may be defined as a % of the rated load or as a defined constant value or as a combination of both. A first balance error margin could be defined such that the elevator is taken out of service if said first balance error margin is exceeded. A second balance error margin could be defined so that a warning code is given if said second balance error margin is exceeded.

Further, a degraded elevator operation may be permitted in a case in which the second balance margin is exceeded. In the degraded elevator operation, the maximum allowed load of the car may be decreased. The decrease of the maximum load of the car may be determined based on the result of the balance check. The load of the car may be measured e.g. with a load cell during the degraded operation. The elevator run may be refused if the measured load of the car exceeds the decreased maximum load of the car.

A brake test of the machinery brakes of the elevator may be performed after the balance check.

The brake test of the machinery brakes may be a motor-assisted brake test.

DRAWINGS

Figure 2:
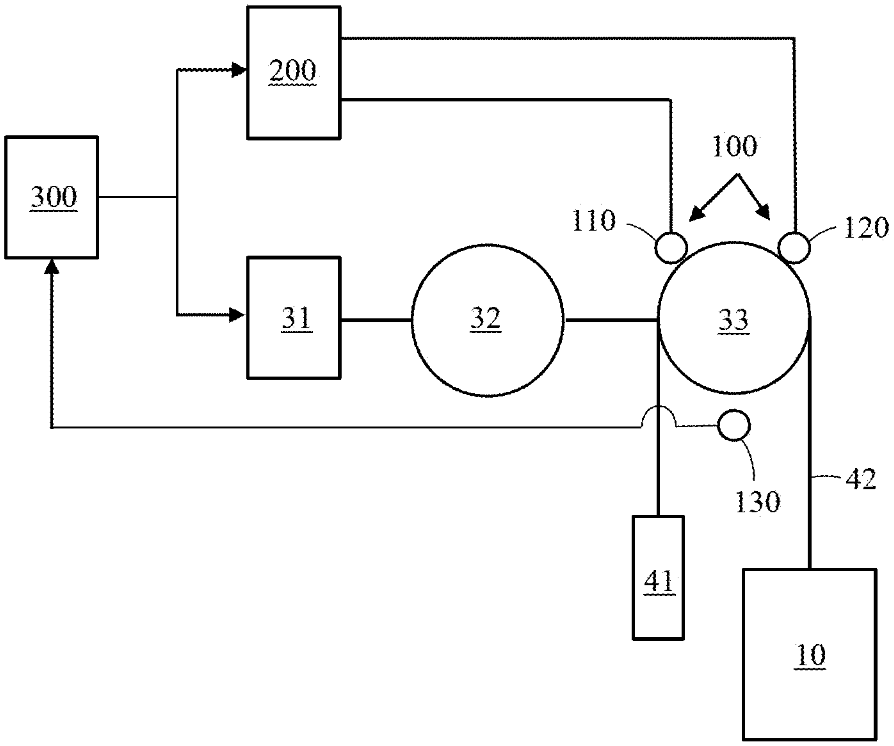
Figure 3:
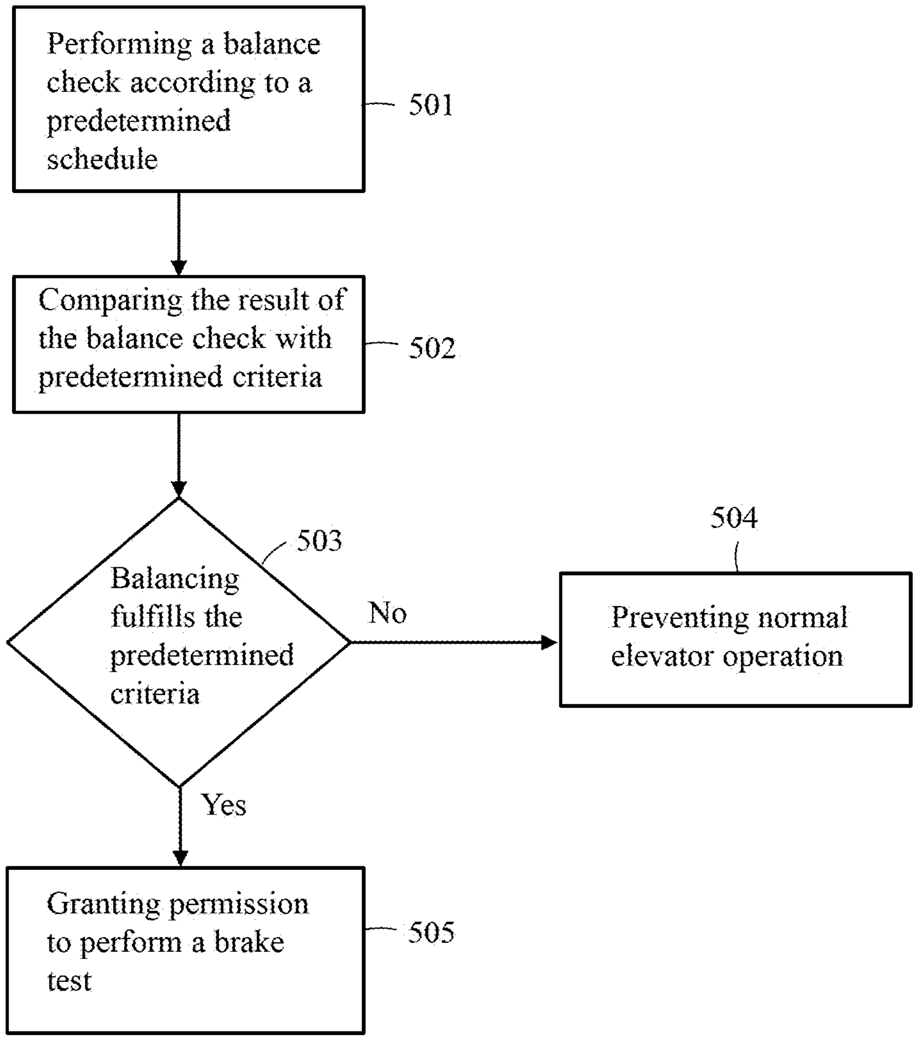

The invention will in the following be described in greater detail by means of preferred embodiments with reference to the attached drawings, in which FIG. 1 shows a side view of an elevator, FIG. 2 shows a side view of an elevator machinery brake system, FIG. 3 shows a flow diagram for testing safety characteristics of an elevator.

DETAILED DESCRIPTION

FIG. 1 shows a side view of an elevator.

The elevator may comprise a car 10, an elevator shaft 20, hoisting machinery 30, ropes 42, and a counterweight 41. A separate or an integrated car frame 11 may surround the car 10.

The hoisting machinery 30 may be positioned in the shaft 20. The hoisting machinery may comprise a drive 31, an electric motor 32, a traction sheave 33, and a machinery brake 100. The hoisting machinery 30 may move the car 10 in a vertical direction Z upwards and downwards in the vertically extending elevator shaft 20. The machinery brake 100 may stop the rotation of the traction sheave 33 and thereby the movement of the elevator car 10.

The car frame 11 may be connected by the ropes 42 via the traction sheave 33 to the counterweight 41. The car frame 11 may further be supported with gliding means 27 at guide rails 25 extending in the vertical direction in the shaft 20. The gliding means 27 may comprise rolls rolling on the guide rails 25 or gliding shoes gliding on the guide rails 25 when the car 10 is moving upwards and downwards in the elevator shaft 20. The guide rails 25 may be attached with fastening brackets 26 to the side wall structures 21 in the elevator shaft 20. The gliding means 27 keep the car 10 in position in the horizontal plane when the car 10 moves upwards and downwards in the elevator shaft 20. The counterweight 41 may be supported in a corresponding way on guide rails that are attached to the wall structure 21 of the shaft 20.

The car 10 may transport people and/or goods between the landings in the building. The elevator shaft 20 may be formed so that the wall structure 21 is formed of solid walls or so that the wall structure 21 is formed of an open steel structure.

FIG. 2 shows a side view of an elevator machinery brake system.

The car 10 may hang on a first side of the traction sheave 33 and the counterweight 41 may hang on an opposite second side of the traction sheave 33. The hoisting ropes 42 may pass from the car 10 over the traction sheave 33 and to the counterweight 41. The traction sheave 33 may be driven by the electric motor 32 which may be formed of a permanently magnetized synchronous electric motor. The machinery brake 100 may comprise two electromagnetic brakes 110, 120 acting on the traction sheave 33. The electromagnetic brakes 110, 120 may be controlled by a machinery brake controller 200. The electric motor 32 may be driven by a drive 31 e.g. a converter. The elevator, the drive 31 and the brake controller 200 may be controlled by a main controller 300. The traction sheave 33 may be provided with a motion measuring device 130, which may be formed of e.g. a tachometer.

The machinery brakes 110, 120 may as a first alternative be tested by a brake test according to method in EP 1 701 904.

The method in said EP patent comprises the following steps.

A predefined test load is set to apply to the drive machine of the elevator. This may be done by loading the elevator car with a test load whose weight is sufficiently reliably known. The weight of the test load depends on the amount of overload that the machinery brakes are required to tolerate. When the machinery brakes are required to withstand a 25% overload, i.e. a 125% load, then the test load must be 75% of the nominal load of the elevator. If the machinery brakes are required to withstand an overload of P %, then the test load must be 50%+P %. The test load may alternatively be provided by the torque of the drive motor without additional weights in the car.

The torque of the motor is then increased until it is established that the car starts moving. The torque value of the motor that starts the movement is measured and stored in memory. This torque value is denoted as a first torque value.

At least one of the machinery brakes is then closed.

The empty elevator car is then driven in the upward direction with the first torque value.

Movement of the car is then checked.

If movement of the car is detected, then the at least one machinery brake is regarded as defective.

The machinery brakes 110, 120 may as a second alternative be tested by a brake test according to method in EP 1 915 311.

The method in said EP patent comprises the following steps.

Only one machinery brake is engaged at an end of an elevator run and the other machinery brakes are engaged with a delay.

The state of the motion of the elevator and any slipping of the machinery brake with one machinery brake engaged is monitored.

The elevator is prevented form starting if the machinery brake is detected as slipping in the previous step.

EP 2 774 885 B1 discloses a method for performing a balance check of an elevator. The balance check determines the balancing weight difference of the elevator. The balancing weight difference is the difference between the weight of the empty elevator car and the counterweight of the elevator.

The method in said EP patent comprises the following steps.

Establishing a power model of the elevator, the power model comprising the power fed to the motor (PM) and power parameters of the motor and the moved components in the shaft (PK, PP, PFr, PCu, PFe).

Performing a test run of the elevator.

Determining mid power values for the up (PME,mid,up) and down (PME,mid,down) direction of the car, said mid power values comprising the power fed to the motor only at the instant when the car is moving through the middle of the travelling path of the elevator car in an up and down direction with constant velocity.

Calculating the power difference between the mid power values in the up and down direction.

Calculating the balancing power difference (mB) from said power difference between the mid power values in the up and the down direction.

The balance check for the elevator may be performed by using a simplified power model of the elevator which comprises the motor power fed to the motor (PM) and the power parameters of the motor and the moved components in the shaft (PK, PP, PFr, PCu, PFe). With such a model the behaviour of the elevator system can be simplified as to retrieve the balancing weight difference (=weight difference between car and counterweight) in an easy manner.

The power model may be defined in the following way:

$$PM=PK+PP+PFr+PCu+PFe$$

Where PM=power fed to the elevator, PK=kinetic power of the moved elevator components, PP=potential power of the moved elevator components, PFr=frictional losses of the elevator components, PCu=internal losses in the winding resistance of the motor, PFe=internal iron losses of the motor.

The power model simplifies an elevator system by modelling the power flow in said system. The necessary information for the balance check may be retrieved by a test run in which the car is driven in at least one closed loop to the upper end and to the lower end of the travelling path of the car.

The power difference in the up and down direction of the car may be determined at a point in which the elevator is driving with constant speed. This makes it possible to disregard the kinetic power PK of the system. The kinetic power PK=mi*v*a, where mi is the mass of the moved components of the elevator system, v is the velocity of the car, a is the acceleration of the car. The acceleration of the car is zero when the elevator runs at constant speed.

The power difference in the up and down direction only in the middle of the travelling path is considered. All moved elevator components except the car and the counterweight are balanced in the middle of the travelling path where the car is aside of the counterweight. The weight portion of these components can thus be disregarded in the middle of the travelling path. These components are e.g. suspension ropes, hoisting ropes or compensation ropes. The relevant components for the balance check that remain are thus the car and the counterweight, which are the essential weight components for the balance check.

The power model may thus be simplified considerably. All components which are based on acceleration can be disregarded. All components which are independent of the travelling direction, e.g. friction losses and iron losses will cancel out as the difference of said values in the up and in the down direction is used in the calculations.

The kinetic power PK is zero in the middle of the travel path of the elevator car.

The power parameter of the copper losses can easily be calculated from the motor current IM and the motor winding resistance RS ($PCu=IM^2*RS$). These copper losses can be subtracted from the motor input power PME=PM−Pcu. PME denotes the amended motor power reduced by the copper losses of the windings.

The power model may thus be simplified to the following model:

$$PME=PP+PFr+PFe$$

The difference between the power values for the motor in the upwards and in the downwards direction may then be determined. The friction losses PFr and the iron losses PFe are further assumed to be independent of the travelling direction of the elevator. The difference between the power values is then:

$$PME(\text{up})-PME(\text{down})=PP(\text{up})-PP(\text{down})$$

The power difference in the up and the down direction is thus only dependent on the potential power parameter. The potential power parameter contains all elevator components which are moved vertically in the elevator shaft, such as e.g. the car, the counterweight, the hoisting ropes, the suspension ropes, and the compensation ropes.

The power difference is only considered for the middle of the travelling path of the car where the elevator car is positioned aside of the counterweight i.e. on the same level. The weight of the other moved elevator components except the car and the counterweight is at the middle of the travelling path balanced. The other moved components are formed e.g. by the hoisting ropes, the suspension ropes, and the compensation ropes. Only the weight of the car and the counterweight are thus relevant in the middle of the travelling path.

The difference between the power values in the middle of the travelling path can then be calculated in the following way:

$$PME(\text{mid,up})-PME(\text{mid,down})=mB*g*V\text{nom}-mB*g*(-V\text{nom})$$

Where mB is the balancing weight difference or balance of the elevator system in kilogram, Vnom is the nominal speed of the elevator, and g is the gravitational acceleration $g=9.81\ m/s^2$.

The balancing weight difference mB may thus be calculated from the following equation:

$$mB=(PME{,}\mathrm{mid,up}-PME{,}\mathrm{mid,down})/(2*g*V\mathrm{nom})$$

The drive unit is thus able to calculate the elevator system balance at the middle point of the shaft by calculating, during constant speed run, the motor current from which the copper losses of the windings are removed in the up and down directions and dividing the difference with the nominator=2 times g times the nominal velocity Vnom of the elevator.

Instead of using one power value in the middle of the elevator shaft, the mean value of several test runs can be used. The arithmetical mean value of the test runs may then be used.

FIG. 3 shows a flow diagram for testing safety characteristics of an elevator.

Step 501 comprises performing a balance check according to a predetermined schedule.

Step 502 comprises comparing the result of the balance check with predetermined criteria.

Step 503 comprises, if balancing fulfills the predetermined criteria, then step 505, else step 504.

Step 504 comprises, preventing normal elevator operation.

Step 505 comprises, granting permission to perform brake test.

The use of the invention is not limited to the elevator disclosed in the figures. The invention can be used in any type of elevator e.g. an elevator comprising a machine room or lacking a machine room, an elevator comprising a counterweight or lacking a counterweight. The counterweight could be positioned on either side wall or on both side walls or on the back wall of the elevator shaft. The drive, the motor, the traction sheave, and the machine brake could be positioned in a machine room or somewhere in the elevator shaft. The car guide rails could be positioned on opposite side walls of the shaft or on a back wall of the shaft in a so called ruck-sack elevator.

It will be obvious to a person skilled in the art that, as the technology advances, the inventive concept can be implemented in various ways. The invention and its embodiments are not limited to the examples described above but may vary within the scope of the claims.

The invention claimed is:

1. A method for testing safety characteristics of an elevator, the elevator including a car, a counterweight, and hoisting ropes coupling the car and the counterweight, the method comprising:

- driving the car in a test run including at least one closed movement loop to an upper end and to a lower end of a travelling path of the car in an up and down direction of the elevator while the car is empty to perform a balance check of the elevator according to a request to perform the balance check; and
- adjustably controlling operation of the elevator based on a result of the balance check, the adjustably controlling including, based on comparing the result of the balance check to predetermined criteria, selectively performing one of
  - preventing normal operation of the elevator,
  - operating the elevator according to a degraded elevator operation, or
  - operating the elevator to perform a brake test of machinery brakes of the elevator based on a test load that is calculated based on the result of the balance check.

2. The method according to claim 1, wherein the request to perform the balance check is generated by a remote entity.

3. The method according to claim 2, wherein the remote entity is a cloud service or a remote server.

4. The method according to claim 1, wherein the request to perform the balance check is based on a predetermined schedule.

5. The method according to claim 4, wherein the request to perform the balance check is based on a time schedule.

6. The method according to claim 4, further comprising preventing the normal operation of the elevator in response to a determination that the balance check is not performed in accordance with the predetermined schedule.

7. The method according to claim 1, wherein the predetermined criteria are based on logbook values collected during earlier tests.

8. The method according to claim 1, wherein the adjustably controlling the operation of the elevator includes operating the elevator to perform the brake test of the machinery brakes in response to a determination that the result of the balance check fulfils the predetermined criteria.

9. The method according to claim 8, wherein the performing the brake test of the machinery brakes includes performing motor-assisted brake test of the machinery brakes.

10. The method according to claim 1, wherein a balance error margin is used to determine whether the result of the balance check fulfils the predetermined criteria.

11. The method according to claim 1, wherein the adjustably controlling the operation of the elevator includes preventing the normal operation of the elevator in response to a determination that the result of the balance check does not fulfil the predetermined criteria.

12. The method according to claim 1, wherein the adjustably controlling the operation of the elevator includes operating the elevator according to the degraded elevator operation in response to a determination that the result of the balance check does not fulfil the predetermined criteria.

13. The method according to claim 12, wherein in thethe operating the elevator according to the degraded elevator operation includes decreasing a maximum load of the car.

14. The method according to claim 1, wherein the performing the balance check comprises:

- establishing a power model of the elevator, the power model including
  - a motor power fed to a motor of the elevator (PM), and
  - power parameters of the motor and moved components in an elevator shaft of the elevator (PK, PP, PFr, PCu, PFe),
- performing a testthe test run of the elevator,
- determining mid power values (PME,mid,up and PME,mid,down) for the up and down direction of the elevator, said mid power values defining the motor power fed to the motor only at an instant when the car is moving through a middle of the travelling path of the car in the up and down direction with constant velocity,
- calculating a power difference between the mid power values in the up and down direction, and
- calculating a balancing weight difference (mB) from said power difference.

15. A computer configured to run program instructions to cause the computer to perform the method according to claim 1.

16. The method according to claim 1, wherein the performing the balance check includes defining a measured load of the car as a new calibrated zero load in response to a determination that the measured load is not zero during a particular time period, and determining a balancing weight difference between a weight of the car while the car is empty and a weight of the counterweight, based on the new calibrated zero load.

* * * * *